(12) United States Patent
Plummer et al.

(10) Patent No.: US 6,284,809 B1
(45) Date of Patent: Sep. 4, 2001

(54) THERMALLY INSULATING SYNTACTIC FOAM COMPOSITION

(75) Inventors: John Plummer, Wrentham; Michael Toupin, Fall River; James Yeh, Foxboro, all of MA (US)

(73) Assignee: Emerson & Cuming Composite Materials Inc., Canton, MA (US)

( * ) Notice: Subject to any disclaimer, the term of this patent is extended or adjusted under 35 U.S.C. 154(b) by 0 days.

(21) Appl. No.: 09/456,158

(22) Filed: Dec. 7, 1999

(51) Int. Cl.[7] .......................................................... C08J 9/32
(52) U.S. Cl. ............................ 521/54; 521/178; 521/135; 523/219
(58) Field of Search ................................. 523/219; 521/54, 521/178

(56) References Cited

U.S. PATENT DOCUMENTS 3,622,437 * 11/1971 Hobaka ................................ 161/168

* cited by examiner

Primary Examiner—Morton Foelak
(74) Attorney, Agent, or Firm—Paul J. Cook

(57) ABSTRACT

A syntactic foam composition is formed from a resin binder containing microspheres and minispheres and having a thermal conductivity less than 0.120 watts/meter° K.

9 Claims, 3 Drawing Sheets

THERMALLY INSULATING SYNTACTIC FOAM COMPOSITION

BACKGROUND OF THE INVENTION

This invention relates to a novel syntactic foam composition and to a method for insulating subsea apparatus such as oil pipelines with the novel syntactic foam composition. More particularly, this invention relates to a novel syntactic foam composition having density, strength and thermal conductivity characteristics which permit its use as an insulation material for subsea apparatus.

Subsea oil pipelines deliver oil from subsea wellheads to surface devices for further distribution. The oil emitted from subsea wells is hot and can endure only a certain amount of cooling during transfer through a pipeline to the surface through ambient seawater without thickening or evolving ices or clathrates which can plug pipelines and reduce the volume flow rate of oil to the surface. The subsea wellhead can be located as deep as 4000–5000 feet or more below the sea surface. To insulate the oil during this transit to the surface, thus keeping it low in viscosity and free-flowing, syntactic insulation is applied to the pipeline by several methods. One of the methods is a pre-cast form which also generally provides buoyancy to the pipeline to stabilize and reduce the weight of the pipeline applied at the surface.

Syntactic insulation refers to a particular type of foam where the foam gas inclusions are provided by means of hollow spherical particles. These hollow spherical particles encapsulate the insulating gas protecting the insulation from collapse due to the high pressures encountered in the subsea environment.

The depth of exposure in the seawater determines the required strength of the syntactic foam in the composite. The strength of the composite is related to the strength of the ingredients, especially the hollow spheres, which primarily determine the low density. The insulating ability of the syntactic foam also is determined by the overall density of the composite. The lower the density, the better the insulating ability since heat travels via transfer of molecular motion from molecule to molecule. The rate of this transfer is a function of the material of transfer and is most directly dependent on density. A vacuum is the best thermal insulator and low density gases such as those filling hollow spheres are superior in general to liquids and solids including composite binders such as epoxies, fillers such as fibers or even the solid walls of hollow spheres made, for example, from glass or epoxy/fiber.

Thus, both buoyancy and insulative capacity are a function of composition, density, and volume filling of hollow spheres. The volume filling of hollow spheres in a syntactic composite article is a function of hollow sphere densities and packing factor(s) of the hollow spheres. The packing factor is related to size and size distribution and is measured as the ratio of bulk density to true particle density. Maximum packing and minimum density is obtained in a composite foam when spheres are touching. Practically, this extreme is realized by a sharp rise in viscosity of the resin/hollow sphere mix prior to any curing. At this point, any further addition of hollow spheres results in a dry mix, incapable of further processing without additional liquid addition.

Packing factors can be improved by using two distinct hollow sphere types in combination which differ in size by, at least, a factor of seven. If a hollow sphere with a size of 100 microns is combined with a hollow sphere with a size of less than 15 microns, or conversely with a hollow sphere greater than 700 microns in size, increased packing is possible because the smaller sphere fits in the interstices between the larger spheres. Resin binder, such as epoxy, then fills the rest of the volume.

It has been proposed in U.S. Pat. No. 3,622,437 to provide syntactic foam compositions having a specific gravity less than one from a composition comprising a resin binder, macrospheres having a diameter of one-half to four inches and smaller spheres having a diameter of one-seventh or less than the macrospheres. While the foam compositions provide sufficient strength and buoyancy to permit their use as pipeline insulators in limited environments, they are not capable of providing the necessary combination of strength, buoyancy and low thermal conductivity at subsea service depths up to 10,000 fee at reasonable insulation thicknesses so that constant flow of petroleum can be maintained through the pipeline. This deficiency is particularly evident when the foam composition is positioned within a carrier pipe of fixed diameter which surrounds the pipeline for the petroleum.

Accordingly, it would be desirable to provide syntactic foam composition which has the buoyancy, strength and thermal insulating properties which permit its practical use as an insulating composition for subsea apparatus such as oil pipelines.

SUMMARY OF THE INVENTION

The present invention is based upon the discovery that a strong buoyant syntactic foam composition having a thermal conductivity less than 0.120 watts/meter-° K and having acceptable strength and buoyancy characteristics which permits its use at subsea depths of up to about 10,000 feet can be formed from a resin binder containing a mixture of hollow microspheres and hollow minispheres. This low thermal conductivity syntactic foam permits its practical use as an insulator for subsea apparatus such as pipelines over a wide depth range beginning at the sea surface. The syntactic foam composition of this invention can be molded into any desired shape such as part of a clamp structure which can be fit about and secured to the outside surface of a subsea pipeline to provide buoyancy and thermal insulation for the pipeline while having sufficient strength as to withstand pressure force up to about 10,000 feet below sea-level.

The syntactic foam compositions of this invention have a density between about 18 and about 45 pounds per cubic foot and a compression strength between about 400 psi and about 6400 psi. The syntactic foam composition of this invention are also characterized by a surprisingly low thermal conductivity of less than 0.120 watts/meter-° K, preferably less than 0.110 watts/meter-° K. The syntactic foam compositions of this invention comprise between about 40 and about 45 volume % of a hardened resin binder containing hollow microspheres of which the microspheres comprise between about 55 and about 60 volume percent and between about 65 and about 50 volume % minispheres.

In contrast to the syntactic foam composition of this invention, syntactic foam compositions wherein the minispheres of the composition of this invention are replaced by macrospheres have significantly higher thermal conductivity of 0.150 watts/meter-° K or greater. These macrosphere-containing compositions are not useful as insulator materials for subsea apparatus such as a pipeline positioned at sea depths of up to about 10,000 feet since heat loss through such insulator materials is too high unless economically impractically thick insulation layers are utilized.

As used herein, the term "syntactic foam" means a hardened or hardenable resin matrix containing small hollow microspheres, such as glass microspheres or polymeric, e.g., polyvinylidene dichloride, phenolic or acrylic, microspheres having a diameter between about 1 and 100 microns as defined by the ASTM Committee on Syntactic Foam. As used herein the term "minispheres" means hollow spheres having a diameter from about 1/8 inch up to 3/8 inch formed from a resin binder either alone or containing reinforcing fibers such as glass fibers, carbon fibers or the like. As used herein the term "macrospheres" means hollow spheres having a diameter from 3/8 inch up to about 5/8 inch formed from a resin binder either alone or containing reinforcing fibers such as glass fibers, carbon fibers or the like.

When forming an insulator for a cylindrical pipeline, the minispheres are first introduced into a mold. The syntactic foam containing microspheres then is introduced into the mold while the resin matrix is in a fluid state, such as by being pumped. The minispheres can have varying diameters or can have essentially the same diameter. After the syntactic composition has been pumped into the mold, the resin portion thereof is allowed to harden by being thermally cured at a suitable temperature to effect cross linking of the resin matrix and to render it thermosetting.

BRIEF DESCRIPTION OF THE DRAWINGS

Figure 1:
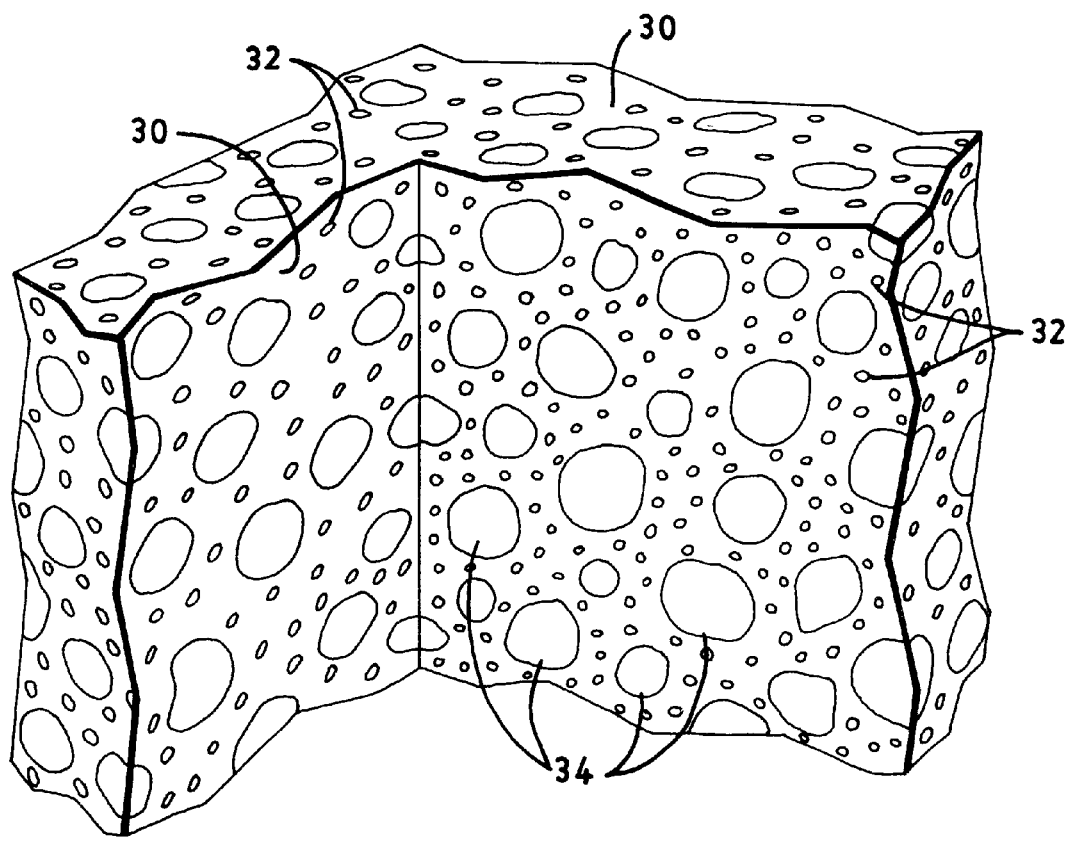
FIG. 1 is a cutaway view of the syntactic foam composition of this invention.

FIG. 1 is a cutaway view of the syntactic foam composition of this invention.

Figure 2:
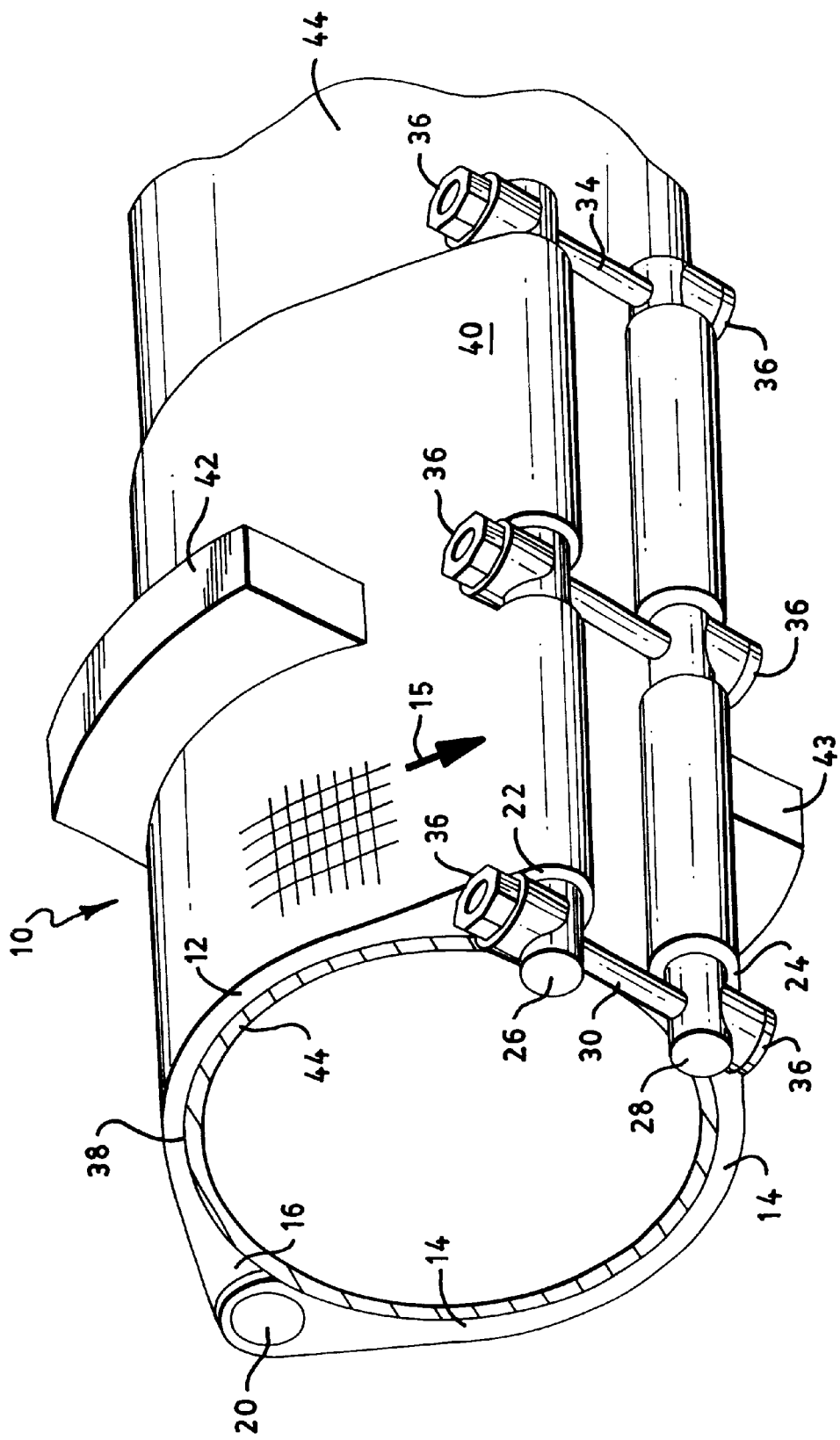
FIG. 2 is an isometric view of an exemplary clamp for a pipeline which can be used with the foam composition of FIG. 1.

FIG. 2 is an isometric view of an exemplary clamp for a pipeline which can be used with the foam composition of FIG. 1.

Figure 3:
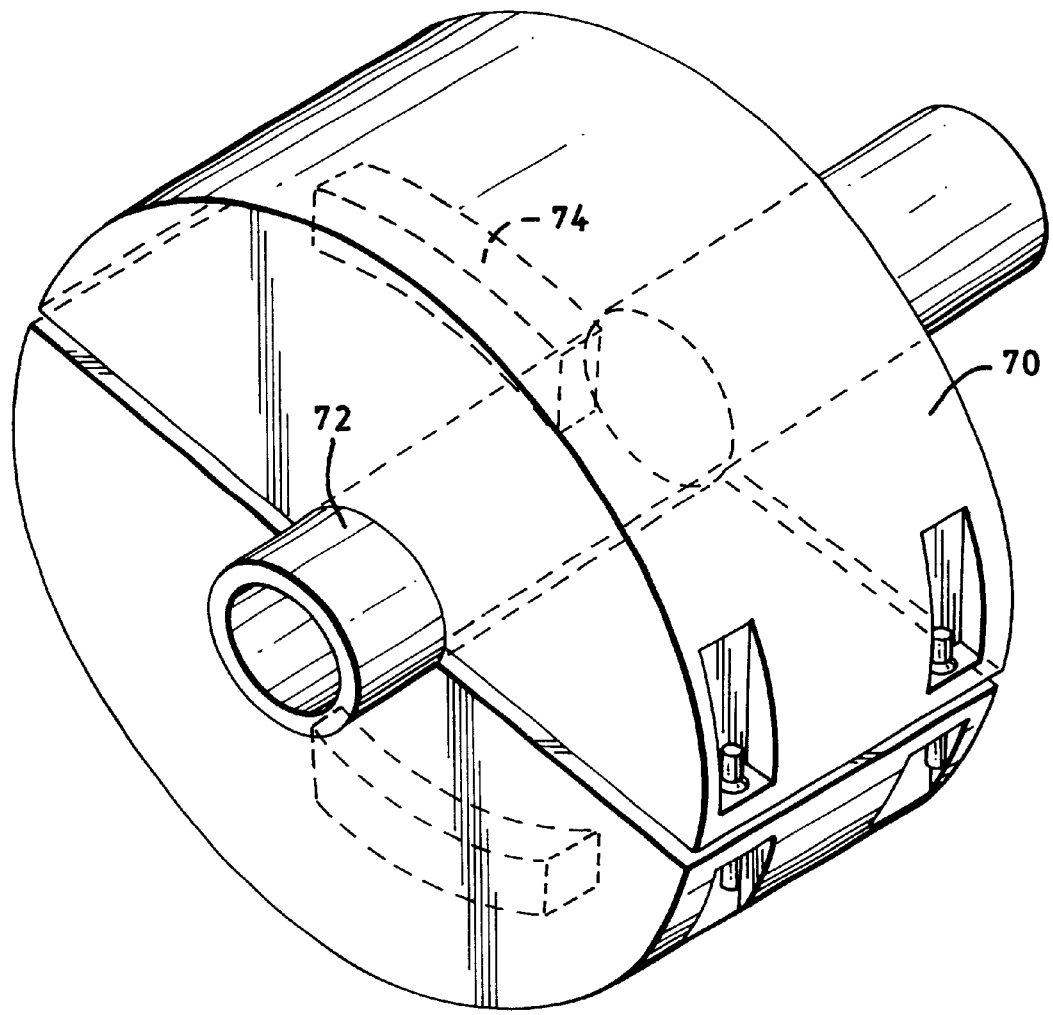
FIG. 3 is an isometric view of a buoyancy module formed of the foam composition of FIG. 1 and used in conjunction with the clamp of FIG. 2.

FIG. 3 is an isometric view of a buoyancy module formed of the foam composition of FIG. 1 and used in conjunction with the clamp of FIG. 2.

DESCRIPTION OF SPECIFIC EMBODIMENTS

In accordance with the present invention, the volume ratio of hardened syntactic foam containing microspheres to minispheres is between about 35 and about 50 volume % syntactic foam containing microspheres, preferably between about 40 and 45 volume % syntactic foam containing microspheres of which the microspheres comprise between about 45 and about 50 volume percent. The minispheres can have an essentially uniform diameter or can have a varying diameter of 1/8 inch up to 3/8 inches, preferably between about 3/16 inch and about 5/16 inch. The minispheres can be formed from any synthetic resin composition which may include a reinforcing agent such as fibers including glass fibers, carbon fibers or the like.

The syntactic foam contains glass or polymer microspheres having a diameter between about 1 and 100 microns, preferably wherein 50% of the microspheres have a diameter between about 30 and about 70 microns. The resin carrier for the syntactic foam initially is a pumpable liquid which is curable over time at room temperature or at elevated temperature. Exemplary resin matrices include phenolic resins, epoxy resins, polyurethanes, polyesters, polyureas, polyvinyl esters, polyamides, or the like. The resin is curable such as with a dianhydride or diamine curing agent to form a cross linked thermoset hardened composition which is not flowable at ambient temperature. If desired, the resin can contain conventional resin modifiers including flexible modifiers such as rubber modifiers including butane based rubbers or strengthening fibers such as glass fibers, mineral fibers, carbon fibers or the like.

Referring to FIG. 1, the syntactic foam portion comprises a hardened resin 2 containing micropheres 4 and minispheres 6 of varying sizes. The minispheres 6 are hollow spheres which are distributed throughout the bulk matrix of resin 2. The density of the syntactic foam comprising the hardened resin 2 and the microspheres 4 ranges between about 30 and about 50 pounds per cubic foot, preferably between about 36 and about 48 pounds per cubic foot. When the minispheres 6 are added to the syntactic foam in the proportion set forth above, the resultant composition comprising the hardened resin 2, the microspheres 4 and minispheres 6 has a density between about 15 and about 50 pounds per cubic foot, preferably between about 18 and about 45 pounds per cubic foot. The thickness of the foam about a pipeline can range from about 1 inch to about 5 feet, preferably between about 3 inches and about 3 feet with the thicker foam layers being deployed at a greater depths to provide the desired combination of strength, thermal conductivity and compressive strength.

This invention will be described below with reference to the clamp structure shown in FIGS. 2 and 3 which is described in detail in U.S. Pat. No. 5,711,639 and which is incorporated herein by reference. However, it is to be understood that the syntactic foam of this invention can be utilized as a pipeline insulator regardless of clamp configuration so long as it is in a form which permits its attachment to the exterior surface of a pipeline such as by being bolted or strapped or with an adhesive. In addition, it is to be understood that the syntactic foam of this invention can be utilized as an insulator for any apparatus suitable for use in a subsea position regardless of shape by being molded into a desired shape within a shaped mold as is conventional in the art such as in the shape of a flat panel or of a wellhead surface.

Referring to FIG. 2, the clamp 10 is formed from two molded sections 12 and 14. The sections 12 and 14 are formed from woven fabric having fibers which extend in the direction 15 about the perimeter of the clamp 10. The hinge section 16 of section 12 and hinge section 18 of section 14 each have holes in them to accommodate rod 20 extending the length of clamp 10. The free end 22 of section 12 and free end 24 of section 14 also have holes to accommodate rods 26 and 28 respectively. Holes are positioned through rods 22 and 24 to accommodate bolts 30, 32 and 35 having nuts 36 at each end. The nuts 36 are rotated on the bolts 30 32 and 34 to adjust the distance between the free end 22 and 24. The interior surface 38 contacts an exterior surface of a cylindrical object 44. The exterior surface 40 of clamp 10 includes at least one key 42 or 43 which fits into a slot within an interior surface of a buoyancy element thereby to fix the buoyancy element on the clamp.

Referring to FIG. 3, a buoyancy element 70 is shown which is positioned about a clamp and a cylindrical object 72 as described above. The buoyancy element 70 includes at least one slot 74 to accommodate a key 42 or 43 of clamp 10 described above. If desired, the slot can be positioned on the clamp 10 and the key or keys can be positioned on the buoyancy element 70. The buoyancy element 70 is formed from the compositions of this invention.

The following example illustrates the present invention and is not intended to limit the same.

EXAMPLE 1

Two syntactic foam compositions were made in order to determine their density and thermal conductivity.

A first syntactic foam composition was formed of 45 volume percent of Bisphenol A epoxy containing an anhydride curing agent comprising 51 volume percent microspheres which was mixed with 55 volume percent macrospheres based on the total volume of the resultant mixed composition. The epoxy composition comprises a blend of phenol, 4,4'-(1-methylidene)bis-, polymer with (chloromethyl) oxirane combined with oxirane, mono((C12-14-alkoxy) methyl) derivatives. The resultant composition was poured into a rectangular 12×12×3 inch mold and cured at 200° F. for 2 hours followed by a post cure at 280° F. for 6 hours. The resultant cured foam composition was removed from the mold and tested. The foam had a density of 34 pounds per cubic foot, a compressive strength of 2600 psi and a thermal conductivity of 0.150 watts/meter° K.

A second syntactic foam composition was formed of 45 volume percent of Bisphenol A epoxy containing an anhydride curing agent comprising 47 volume percent microspheres which was mixed with 55 volume percent minispheres based on the total volume of the resultant mixed composition. The resultant composition was poured into a rectangular 12×12×3 inch mold and cured at 200° F. for 2 hours followed by a post cure at 280° F. for 6 hours. The resultant cured foam composition was removed from the mold and tested. The foam had a density of 38 pounds per cubic foot, a compressive strength of 2500 psi and a thermal conductivity of 0.109 watts/meter° K. The syntactic foam compositions had the characteristics set forth in Table 1.

spheres and between about 55 and about 60 volume percent of minispheres based on the total volume of said syntactic foam composition, said syntactic foam composition having a thermal conductivity less than 0.120 watts/meter-° K.

2. The syntactic foam composition of claim 1 wherein the hardened resin is epoxy resin.

3. The composition of claim 1 having a thermal conductivity less than 0.110 watts/meter-° K.

4. The syntactic foam composition of claim 3 wherein the hardened resin is epoxy resin.

5. A formed insulating layer positioned about an outside surface of an apparatus suitable for use in a subsea position, said layer having a thickness between about 1 inch and about 5 feet and formed from the composition of claim 1.

6. A formed insulating layer positioned about an outside surface of an apparatus suitable for use in a subsea position, said layer having a thickness between about 1 inch and about 5 feet and formed from the composition of claim 2.

7. A formed insulating layer positioned about an outside surface of an apparatus suitable for use in a subsea position, said layer having a thickness between about 1 inch and about 5 feet and formed from the composition of claim 3.

8. A formed insulating layer positioned about an outside surface of an apparatus suitable for use in a subsea position, said layer having a thickness between about 1 inch and about 5 feet and formed from the composition of claim 4.

TABLE 1

| FOAM TYPE | FOAM DENSITY (g/cc) | MICROSPHERE DENSITY (g/cc) | HOLLOW SPHERE TYPE | HOLLOW SPHERE SIZE (in) | HOLLOW SPHERE DENSITY (pcf) | K VALUE (W/mdegK) |
|---|---|---|---|---|---|---|
| Macrosphere | 0.545 | 0.20 | MACRO | 3/8–5/8 | 27 | 0.150 |
| Minisphere | 0.609 | 0.20 | MINI | 3/16–5/16 | 28 | 0.109 |

(g/cc) is density in grams per cubic centimeter
(pcf) is true density in pounds per cubic foot
(W/mdegK) is insulative capacity ("K") in Watts/meter per degree Kelvin

What is claimed is:

1. A syntactic foam composition comprising between about 21 and about 24 volume percent of a hardened resin, between about 14 and about 21 volume percent of micro- 9. The formed insulating layer of any one of claims 5, 6, 7, or 8 having a cylindrical surface.

* * * * *